US008774140B2

(12) United States Patent
Levy et al.

(10) Patent No.: US 8,774,140 B2
(45) Date of Patent: Jul. 8, 2014

(54) METHOD AND APPARATUS TO PROVIDE HIDDEN NODE PROTECTION

(75) Inventors: Shmuel Levy, Qiryat Tivon (IL); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1387 days.

(21) Appl. No.: 11/603,230

(22) Filed: Nov. 22, 2006

(65) Prior Publication Data

US 2008/0095137 A1 Apr. 24, 2008

Related U.S. Application Data

(60) Provisional application No. 60/852,661, filed on Oct. 19, 2006.

(51) Int. Cl.
*H04W 4/00* (2009.01)

(52) U.S. Cl.
USPC ............ 370/338; 370/230; 370/348; 370/342

(58) Field of Classification Search
USPC .................. 370/338, 230, 348, 342
See application file for complete search history.

(56) References Cited

U.S. PATENT DOCUMENTS

| | | | |
|---|---|---|---|
| 6,832,091 B1 * | 12/2004 | Sugaya ........................ 455/450 |
| 7,385,945 B1 * | 6/2008 | Olson et al. ................... 370/328 |
| 7,756,542 B1 * | 7/2010 | Kaiser et al. .................. 455/522 |
| 2002/0172186 A1 * | 11/2002 | Larsson ........................ 370/349 |
| 2003/0012167 A1 * | 1/2003 | Benveniste ................... 370/338 |
| 2003/0181204 A1 * | 9/2003 | Benveniste ................ 455/422.1 |
| 2004/0002357 A1 * | 1/2004 | Benveniste ................ 455/550.1 |
| 2005/0041616 A1 * | 2/2005 | Ginzburg et al. ............. 370/328 |
| 2005/0058151 A1 * | 3/2005 | Yeh .............................. 370/445 |
| 2005/0075142 A1 * | 4/2005 | Hoffmann et al. .......... 455/562.1 |
| 2005/0089057 A1 * | 4/2005 | Kang et al. ..................... 370/445 |
| 2005/0254513 A1 * | 11/2005 | Cave et al. .................... 370/445 |
| 2005/0285803 A1 * | 12/2005 | Iacono et al. ................. 343/702 |
| 2006/0025136 A1 * | 2/2006 | Fujita et al. ................... 455/436 |
| 2006/0046739 A1 * | 3/2006 | Blosco et al. ................. 455/453 |
| 2006/0089148 A1 * | 4/2006 | Zhao et al. .................... 455/447 |
| 2006/0146887 A1 * | 7/2006 | Muguruma et al. .......... 370/503 |
| 2006/0193299 A1 * | 8/2006 | Winget et al. ................. 370/338 |
| 2006/0209712 A1 * | 9/2006 | Morioka et al. .............. 370/252 |
| 2007/0115907 A1 * | 5/2007 | Myles et al. .................. 370/338 |
| 2007/0140191 A1 * | 6/2007 | Kojima ......................... 370/338 |
| 2007/0195812 A1 * | 8/2007 | Lee .............................. 370/445 |
| 2008/0069036 A1 * | 3/2008 | Lee et al. ...................... 370/328 |
| 2008/0076465 A1 * | 3/2008 | Larsson ........................ 455/522 |
| 2008/0076466 A1 * | 3/2008 | Larsson ........................ 455/522 |
| 2008/0144493 A1 * | 6/2008 | Yeh .............................. 370/230 |
| 2008/0151860 A1 * | 6/2008 | Sakoda et al. ................ 370/348 |
| 2008/0212547 A1 * | 9/2008 | Sugaya et al. ................ 370/338 |
| 2008/0267124 A1 * | 10/2008 | Zhao et al. .................... 370/329 |
| 2008/0273606 A1 * | 11/2008 | Orfanos et al. ............... 375/260 |
| 2010/0022262 A1 * | 1/2010 | Aue .............................. 455/501 |
| 2010/0150167 A1 * | 6/2010 | Oksman ....................... 370/458 |

* cited by examiner

*Primary Examiner* — Lester Kincaid
*Assistant Examiner* — Mehmood B Khan
(74) *Attorney, Agent, or Firm* — Cool Patent, P.C.

(57) ABSTRACT

A method and a wireless communication device to overcome a hidden node problem in a BSS The method includes detecting that transmitting one or more data frames causing one or more nodes of an unsynchronized wireless communication network to become hidden nodes. The wireless communication device that causes the hidden node problem requests a time allocation for transmitting one or more data frames to at least one node of the unsynchronized wireless communication network and to transmit the one or more data frames using an antenna beam forming technique at the allocated time frame.

7 Claims, 4 Drawing Sheets

METHOD AND APPARATUS TO PROVIDE HIDDEN NODE PROTECTION

CROSS-REFERENCE TO RELATED APPLICATIONS

This application claims the benefit of U.S. provisional application Ser. No. 60/852,661, filed Oct. 19, 2006, and entitled "METHOD AND APPARATUS TO PROVIDE HIDDEN NODE PROTECTION".

BACKGROUND OF THE INVENTION

Wireless local area networks (WLAN) may include a basic service set (BSS). The BSS may include an access point (AP) and one or more stations (ST). The stations of the BSS may also be referred as nodes. A hidden node is a known problem of the BSS. The hidden-node problem may occur when there are at least three nodes in the wireless network: node A, node B, and node C. Node B is within range of both node A and node C, but node A and node C are out of range of each other. When node A wishes to transmit to node B, it first senses the wireless network medium and, if no traffic is detected, it initiates its transmission. Because node C is out of range of node A, however, it is unable to detect the transmissions of node A. Thus, node C may begin to transmit while node A is transmitting to node B, resulting in a collision that interferes with the communication.

To overcome the hidden-node problem, the IEEE 802.11 standard provides a handshaking protocol that allows both node A and node B to reserve the wireless medium for a predetermined amount of time before node A is permitted to transmit user data. When node A wishes to transmit to node B, it first transmits a request-to-send (RTS) frame to node B that indicates the desire to transmit data. The RTS frame also includes a network allocation vector (NAV) that indicates a time period during which the wireless medium is to be reserved. Nodes that receive the RTS frame then record the NAV and refrain from transmitting for the corresponding period. When node B receives the RTS frame, it responds by transmitting a clear-to-send (CTS) frame back to node A that indicates that it is okay to begin transmission. The CTS frame also includes a NAV that reserves the same time period. Because node C is within range of node B, node C receives the CTS frame, reads the NAV, and refrains from transmitting for the indicated period, thus preventing a collision. After node A receives the CTS frame from node B, it may initiate the transmission of user data to node B. After the data has been fully received, node B may transmit an acknowledgement (ACK) frame to node A to indicate that the data has been successfully received.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
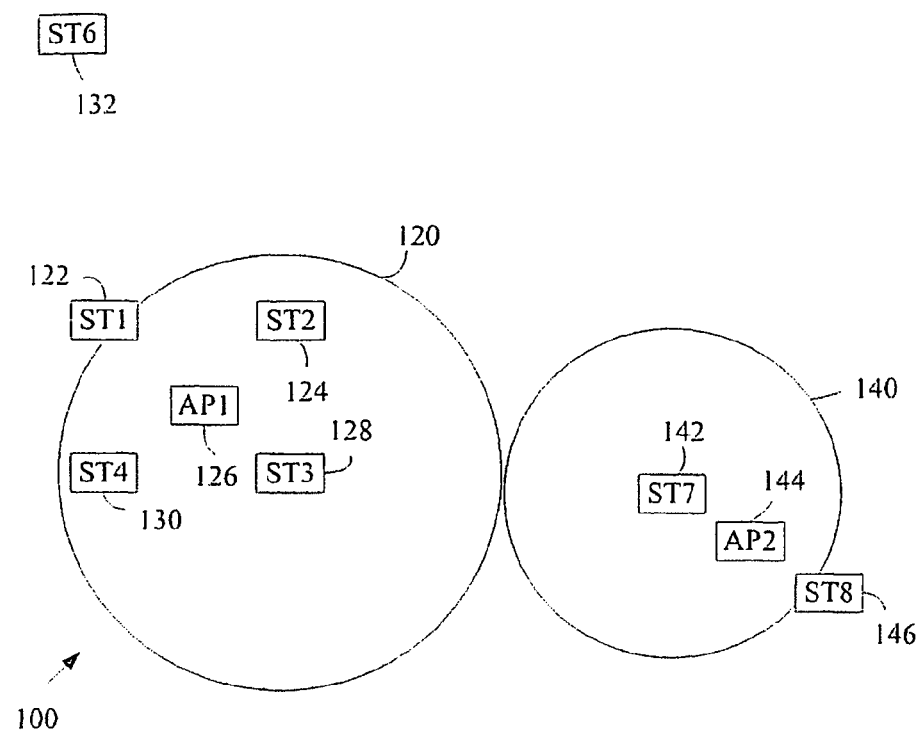
FIG. 1 is a schematic illustration of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. It will, however, be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, Such as electronic, quantities within the Computing system's registers and/or memories into other data similarly represented as physical quantities within the computing system's memories, registers or other such information storage, or transmission devices.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, two-way radio stations, digital system stations, analog system stations, cellular radiotelephone stations, and the like.

Types of WLAN stations intended to be within the scope of the present invention include, although are not limited to, mobile stations, access points, stations for receiving and transmitting spread spectrum signals such as, for example, Frequency-Hopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1, a wireless communication system, for example, a WLAN 100 is shown. Although the scope of the present invention is not limited in this respect, WLAN 100 of FIG. 1 may be defined, by IEEE 802-11-1999 standard, as an Extended Service Set (ESS). For example, the ESS may include BSS 120 and BSS 140, if desired. According to one exemplary embodiment of the invention, BSS 120 may include stations 122, 124, 128, 130, 132 (e.g., ST1, ST2, ST3, ST4, ST6, respectively) and AP 126 (e.g., AP1). BSS 140 may include stations 142, 146 (e.g., ST7, ST8, respectively) and AP 144 (e.g., 144).

Figure 2:
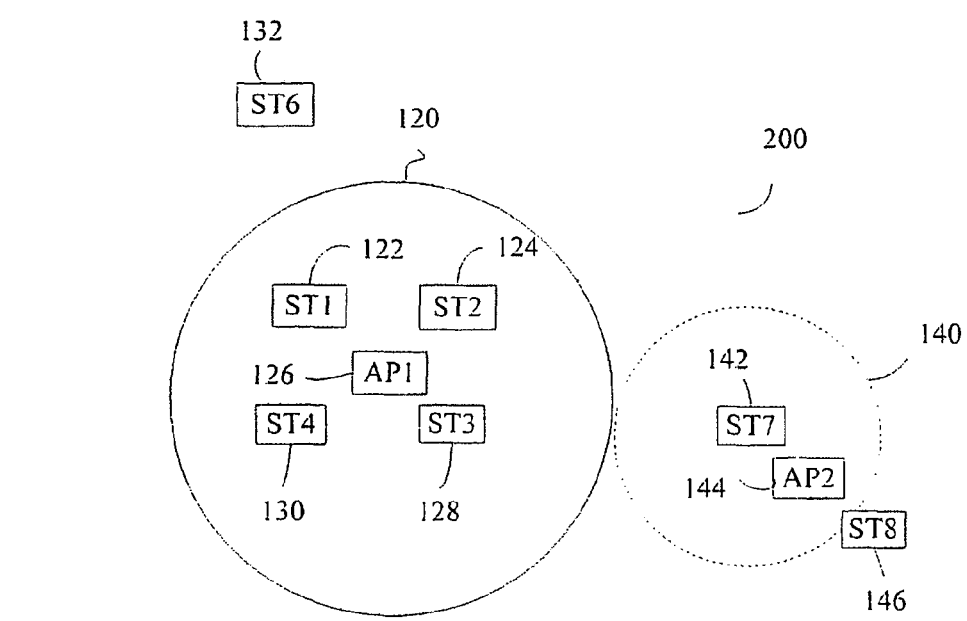
FIG. 2 is a schematic illustration of a wireless communication system helpful to demonstrate a hidden-node problem within the wireless communication system of FIG. 1.

Turning to FIG. 2, a graphic presentation of a hidden-node problem within WLAN 100 of FIG. 1 is shown.

According to this exemplary embodiment of the invention, transmissions of station 132 (e.g., ST6) may make other stations (e.g., stations 122, 124, 128, 130 of BSS 120) to be referred as hidden nodes because their transmissions may not be sensed by station 132 before station 132 transmits. Stations 122, 124, 128, 130, 132 may employ an RTS/CTS protection mechanism in order to extend the transmission range of BSS 120. The extended transmission range, as is shown by circle 200, may cover the remote station (e.g., station 132). Extended transmission range 200 may, however, also cover some stations of BSS 140 (e.g., ST7, AP2). Thus, transmissions of stations of BSS 120 may interfere by transmissions originated by the stations of BSS 140 and vice versa.

According to some exemplary embodiments of the invention, a time separation between transmissions of stations 122, 124, 128, 130 and station 132 may be employed in order to overcome the hidden-node problem. For example, AP 126 may allocate a time frame to employ a medium access mechanism such as, for example, a Hybrid Coordinated Channel Access, a Power Save Multiple Poll, a Phase Controlled Operation or the like to exchange transmissions in a low transmission rate with station 132 while in at least one other time frame, stations 122, 124, 128, 130 may transmit data frames in a high transmission rate, if desired.

According to one exemplary embodiment of the invention, station 132 may recognize its remote position by observing, for example, excessive collisions, and/or according to WLAN statistics that may be collected and/or recorded and/or manipulated by AP 126. Furthermore, station 132 may recognize its remote position by detecting RTS/CTS from at least one other station of BSS 120, but not seeing the related data frames and acknowledges (ACKs) or the like which should be transmitted as response to the RTS/CTS signals. Once station 132 detects that it is remote from other stations of BSS 120 and its remote location may cause the hidden-node problem, station 132 may request from AP 126 to schedule an access time frame to access BSS 120 wireless medium. AP 126 may provide a desired medium access mechanism schedule, controls and protect station 132 transmissions from colliding with transmissions of at least one station of BSS 120. Hence, only in the scheduled access time of station 132 the range of the transmissions of station 132 may overlap with the range of the transmissions of BSS 120 stations.

It should be understood that BSS 120 and/or BSS 140 may include other optional devices and the scope of the present invention is not limited to the above described embodiments of the invention.

Figure 3:
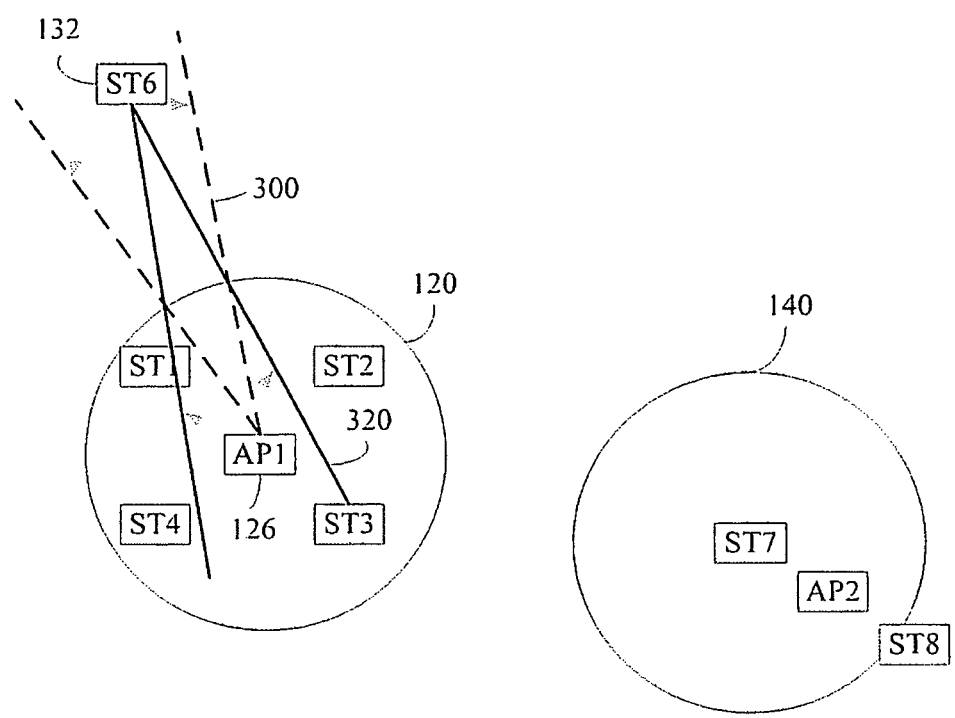
FIG. 3 is a schematic illustration of a wireless communication system of FIG. 1, to demonstrate a use of an antenna beam forming transmission scheme to overcome the hidden-node problem according to another exemplary embodiment of the present invention is shown.

Turning to FIG. 3 a schematic illustration of a wireless communication system of FIG. 1 (e.g., WLAN 100), to demonstrate a use of an antenna beam forming transmission scheme to overcome the hidden-node problem according to another exemplary embodiment of the present invention is shown. According to this exemplary embodiment, a separation in a space domain between transmissions of station 132 to AP 126 and transmissions of other station of BSS 120 may be done. In some embodiments of the invention the separation in the space domain may be done in an addition to the time separation in order to reduce or eliminate an overlapping effect of BSS 120 with BSS 140, if desired.

According to exemplary embodiments of the present invention, AP 126 and station 132 may include antenna beam forming mechanism (not shown). AP 126 may generate an antenna beam 300 and may direct antenna beam 300 to station 132. Station 132 may generate an antenna beam 320 and may direct antenna beam 300 to AP 126. According to embodiments of the present invention antenna beams 300 may be narrow beams which may able to transfer transmission without causing interference to at least on other station of the BSS. In this way a separation in the space domain is reached. Relative high rate transmissions of station 132 and AP 126 may not interfere with transmission of the other stations of BSS 120.

Figure 4:
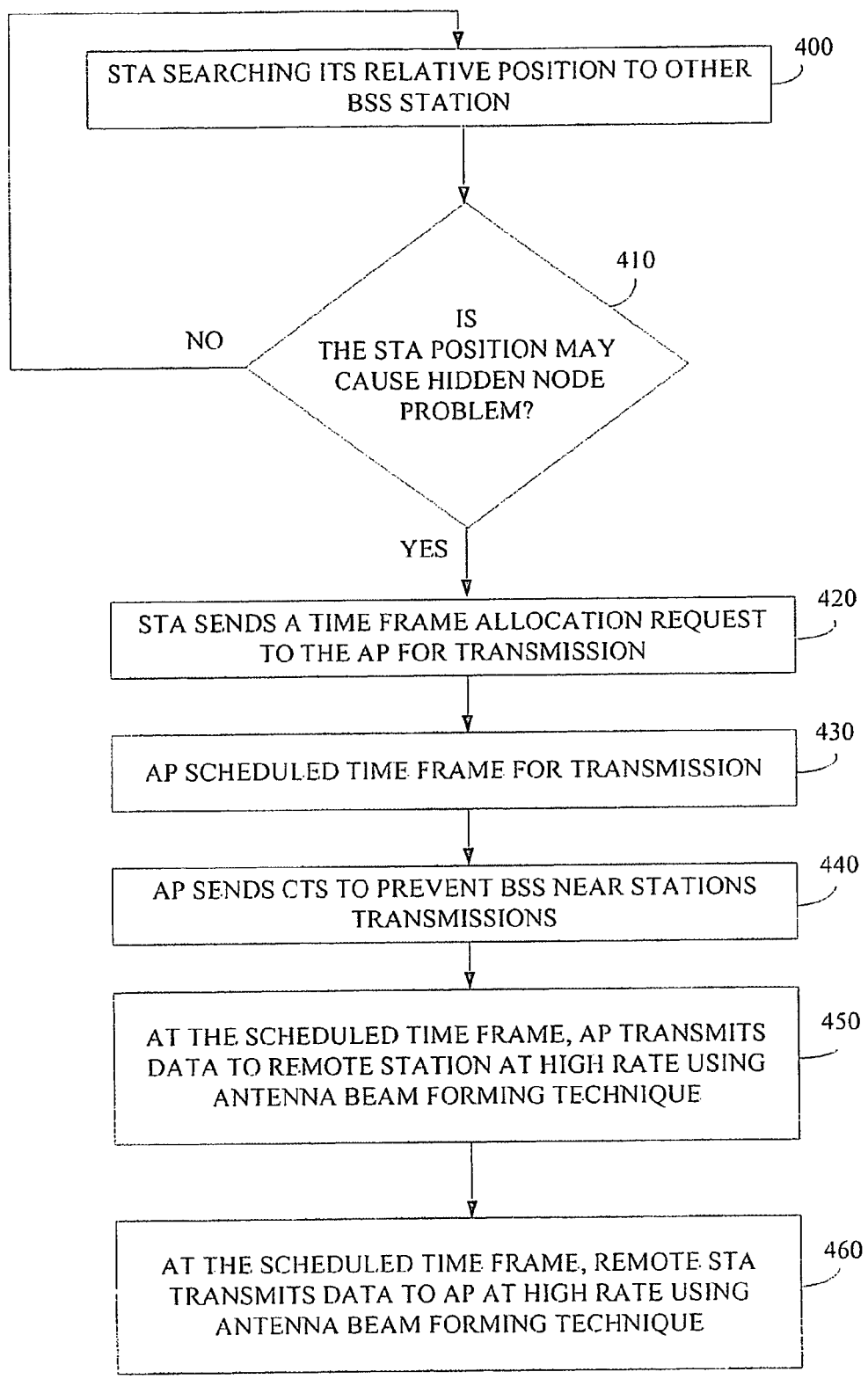
FIG. 4 is a flow chart of a method of overcoming a hidden-node problem according to some exemplary embodiments of the present invention.

Turning to FIG. 4 a method to overcome a hidden-node problem according to some exemplary embodiments of the present invention is shown. Although the scope of the present invention is not limited in this respect, a station of a BSS (e.g., station 132) may search its relative position to other stations of the BSS (text block 400). If the station position may cause a hidden-node problem (diamond block 410). For example, by detecting hidden nodes at BSS 120. The station (e.g., station 132) may send a time frame allocation request to an AP for example, AP 126 (text block 420).

According to this exemplary embodiment of the invention, the AP may schedule the requested time frame for transmission (text block 430). The AP may send a self CTS command to prevent close vicinity stations of the BSS to transmit (text block 440). For example, in order to limit the self CTS command propagation, the AP may send the self CTS command at a rate that limits the propagation. At the requested schedule time frame AP (e.g., AP 126) may transmit data to remote station (e.g., station 132) at a high rate using antenna beam forming technique (text block 450). In response, the remote station (e.g., station 132) may transmit data to the AP at a high rate using antenna beam forming technique (text block 460).

Figure 5:
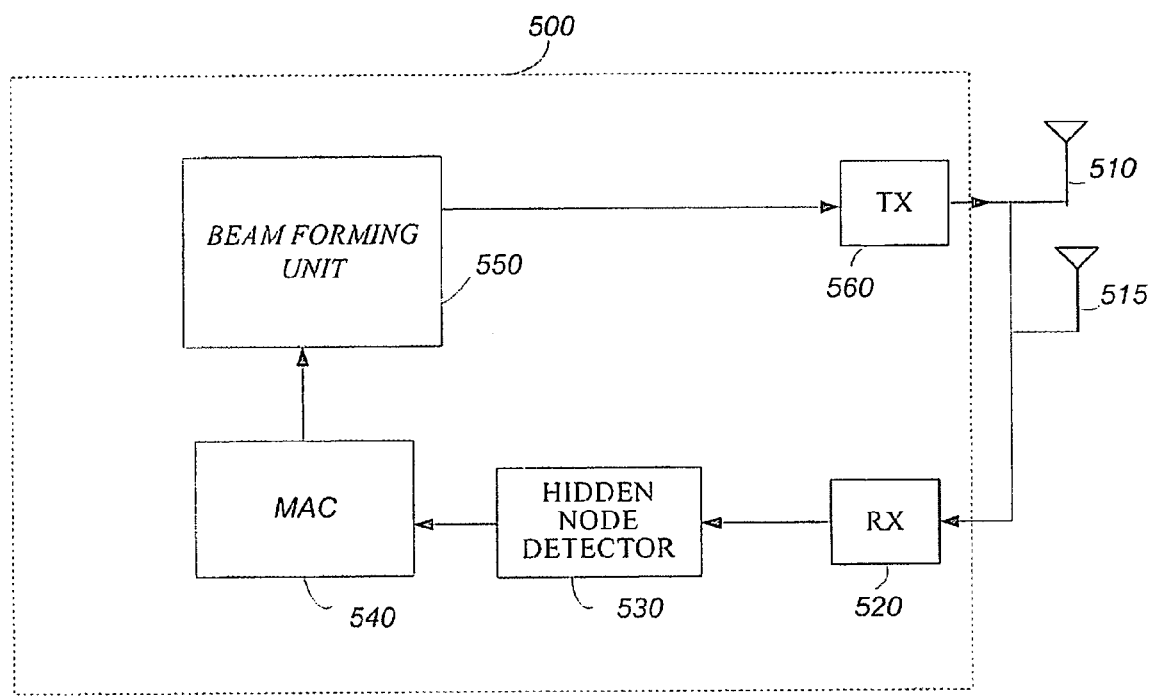
FIG. 5 is an illustration of a block diagram of a wireless communication device according to an exemplary embodiment of the present invention.

Turning to FIG. 5 an illustration of a block diagram of a wireless communication device 500 according to an exemplary embodiment of the present invention is shown. Wireless communication device 500 may include antennas 510, 515, a receiver (RX) 520, a hidden-node node detector 530 a medium access controller (MAC) 540, a beam forming unit 550 and a transmitter (TX) 560.

According to some exemplary embodiments, of the invention TX 560, RX 520 and antennas 510, 515 may operate according to multiple inputs multiple outputs (MIMO) schemes. Although the scope of the present invention is not limited in this respect, antennas 510, 515 may include an antenna array, a dipole antenna, a monopole antenna, a Yagi-Uda antenna, an omni-directional antenna, a directional antenna and the like.

According to exemplary embodiments of the invention, antennas 510 and 515 may receive a transmission from a station of an unsynchronized wireless communication network (e.g.,. WLAN 100). Hidden-node detector 530 may detect that wireless communication device 500 relative location to the other stations of the unsynchronized wireless communication network (e.g., BSS 120) may create hidden nodes at the unsynchronized wireless communication network (e.g., BSS 120). For example, hidden-node detector 530 may detect the existence of the hidden nodes by observing excessive collision of transmissions of the one or more stations of the unsynchronized wireless communication network. In another embodiment of the invention, hidden node detector 530 may detect existence of the hidden node by detecting request-to-send\clear-to-send (RTS \CTS) commands received from the one or more stations of the unsynchronized wireless communication network without detecting related acknowledgement massages and/or transmissions of the one or more data frames from the one or more stations of the unsynchronized wireless communication network.

According to embodiments of the invention, if the hidden-node detector 530 detects existence of hidden nodes, MAC 540 may request a time allocation for transmitting one or more data frames. An AP (e.g., AP 126) may schedule and/or allocate a time frame for transmitting one or more data frames, if desired.

Before transmitting at the allocated and/or scheduled time frame, MAC 540 may send a control signal for example, self CTS, to prevent transmission of one or more stations of the wireless communication network. Furthermore, antenna beam forming unit 550 may form antenna beams which may propagate by antennas 510 and 515 to transmit said one or more data frames at the allocated time frame. At the allocated time frame, RX 520 may receive a beam formed transmissions of one or more data frames at said allocated time frame, although the scope of the present invention is not limited to this example.

It should be understood that the embodiments of the inventions as describe above may be implemented by hardware and/or by software and/or by any combination of hardware and software.

While certain features of the invention have been illustrated and described herein, many modifications, substitutions, changes, and equivalents will now Occur to those skilled in the art. It is, therefore, to be understood that the appended claims are intended to cover all such modifications and changes as fall within the true spirit of the invention.

What is claimed is:

1. A method of transmitting in an Extending Service Set (ESS) which includes a first Basic Service Set (BSS) with a hidden node and a second BSS, the method comprising:
   receiving a request from a remote station to schedule a time frame for transmitting one or more data frames to the remote station of said first BSS without interfering with transmissions of one or more stations of the second BSS, the received request being generated by the remote station detecting the hidden node as the remote station searched its position relative to another station and observed excessive collision of transmissions of the one or more stations of the first BSS, the hidden node comprising a station other than the remote station;
   sending a self clear-to-send (CTS) request to close vicinity stations of the first BSS to prevent transmission by the close vicinity stations; and
   transmitting the one or more data frames to the remote station using an antenna beam forming technique at the scheduled time frame.

2. The method of claim 1, wherein the detection comprises:
   detecting request-to-send\clear-to-send (RTS\CTS) control commands of the one or more stations of the first BSS without detecting related acknowledgement messages and transmissions of the one or more data frames from the one or more stations of the first BSS.

3. A wireless communication device, comprising:
   a hidden-node detector configured to detect a hidden node by searching a position of the wireless communication device relative to another station of a first Basic Service Set (BSS) and by observing excessive collisions of transmissions of one or more stations of the first BSS, the hidden node comprising a station other than the wireless communication device;
   a medium access controller to request a time allocation for transmitting or receiving one or more data frames to or from an access point without interfering with transmissions of stations of a second BSS;
   an antenna beam forming unit to transmit said one or more data frames using an antenna beam forming technique at the requested allocated time frame; and
   a receiver to receive a directed narrow beam transmission from the access point at the requested allocated time frame.

4. The wireless communication device of claim 3, wherein the hidden-node detector is able to detect the hidden nodes by detecting request-to-send\clear-to-send (RTS\CTS) control commands of the one or more stations of the first BSS without detecting related acknowledgement massages and transmissions of the one or more date frames from the one or more stations of the first BSS.

5. A wireless local area network including at least a first Basic Service Set (BSS) and a second BSS, wherein the first BSS comprises:
   at least one mobile station comprising:
      at least a hidden-node detector to detect a hidden node by searching a position of the mobile station relative to other stations of the first BSS and observing excessive collision of transmissions of the one or more stations of the first BSS, the hidden node comprising a station other than the mobile station,
      a medium access controller to request a time allocation for transmitting one or more data frames from an access point of the first BSS without interfering with transmissions of stations of a second BSS, and
      an antenna beam forming unit to transmit said one or more data frames using an antenna beam forming technique at the requested allocated time frame; and
   said access point to allocate the requested time frame, to send a self clear-to-send (CTS) request to close vicinity stations of the first BSS to prevent transmission by the close vicinity stations and to transmit one or more data frames to the mobile station at the allocated time frame using a directed narrow antenna beam.

6. The wireless local area network of claim 5, wherein the hidden-node detector is able to detect the hidden nodes by detecting request-to-send\clear-to-send (RTS\CTS) control commands of the one or more stations of the first BSS without detecting related acknowledgement messages and transmissions of the one or more date frames from the one or more stations of the first BSS.

7. The wireless local area network of claim 5, comprising:
   a receiver to receive a beam formed transmissions of one or more data frames at said allocated time frame.

* * * * *